United States Patent [19]

Boyer et al.

[11] 4,042,173
[45] Aug. 16, 1977

[54] METHOD AND APPARATUS FOR CONTROLLING VOLUME AIR FLOW

[75] Inventors: George C. Boyer; Raymond J. Fermanich, both of Rockford, Ill.

[73] Assignee: Barber-Colman Company, Rockford, Ill.

[21] Appl. No.: 610,122

[22] Filed: Sept. 4, 1975

[51] Int. Cl.² ............................................. F24F 7/04
[52] U.S. Cl. .................................... 236/49; 137/486; 236/80 R
[58] Field of Search ............... 236/49, 80 R; 137/486; 251/47, 48

[56] References Cited
U.S. PATENT DOCUMENTS

| 3,081,847 | 3/1963 | Smitley | 251/48 X |
| 3,361,157 | 1/1968 | Schach | 137/489 |
| 3,719,321 | 3/1973 | McNabney | 236/49 |
| 3,779,275 | 12/1973 | Ley et al. | 236/49 X |
| 3,809,314 | 5/1974 | Engelke et al. | 236/49 |
| 3,941,310 | 3/1976 | Travaglio et al. | 236/49 |
| 3,945,565 | 3/1976 | Lynch et al. | 236/49 |

Primary Examiner—William E. Wayner
Assistant Examiner—William E. Tapolcai, Jr.
Attorney, Agent, or Firm—A. Richard Koch

[57] ABSTRACT

A butterfly damper, controlling volume air flow through a duct, is biased toward a closed position at least partially by aerodynamic pressure and is moved against its bias by a small pneumatic actuator in response to a sensed condition. The position of the damper is stabilized by a feedback and oscillations are damped.

23 Claims, 3 Drawing Figures

METHOD AND APPARATUS FOR CONTROLLING VOLUME AIR FLOW

BACKGROUND OF THE INVENTION

This invention concerns control of the volume of air flowing through a duct. More particularly it concerns the combination of various features in a control, whereby a small actuator consuming low power may be used.

Prior systems have employed butterfly dampers, pivoted near their midpoints to control air flow through ducts. Some form of power must be supplied to move such a damper toward both full open and closed positions. It is common to employ a controlled actuator to move the damper toward full open position in opposition to a means biasing the damper toward closed position. One example of such biasing means is a return spring. In order to exert equal forces in opposite directions, return springs are designed to exert half the force produced by the actuator. This wastes half of the power of the actuator in compressing the return spring and thus makes a larger, more powerful actuator necessary.

Roger P. Engelke and Marvin H. Zille, in U.S. Pat. No. 3,809,314, describe a damper control employing a pneumatic bellows to move the damper toward full open position and, although they did not say so, relying upon the weight of the actuator, its connecting linkages and sometimes auxiliary weights to bias the damper toward closed position. They did not rely upon aerodynamic forces for biasing. In other respects the control disclosed by them is similar to that described and claimed herein.

Albert W. Schach in U.S. Pat. No. 3,361,157, reissued as U.S. Reissue Pat. No. 26,690, described a butterfly damper pivoted at its center and always biased (he believed) toward closed position by unbalanced aerodynamic forces resulting from air flow past the damper. The damper was operated, in supposed opposition to the bias, by a small pneumatic bellows with no return spring. Operation was unstable with a tendency for the damper to oscillate. The reasons for these oscillations were not known. A more conventional damper operator, with large bellows and not relying upon a bias produced by aerodynamic forces, was substituted. Oscillation of the damper may produce widespread undesirable consequences. Not only does it produce undesirable fluctuating air flow into the space being supplied, but these fluctuations are detected by the flow sensor controlling the bellows, causing it to move in response to the fluctuations. This may reinforce the original oscillations, prodcing sustained oscillation and thus aggravating the undesirable condition. Usually a plurality of air flow controllers control air flow through respective ducts supplied with air from a common plenum. When the damper in one controller begins to oscillate, it produces upstream pressure variations, which are transmitted to the other dampers. These other dampers may then begin to oscillate, producing the undeirable fluctuating air flow into the space supplied by the respective ducts. Cases have been known in which the entire air distribution system began to oscillate in synchronism. More conventional volume air flow controllers employ actuators and return means so powerful that they swamp out the effect of unbalanced aerodynamic forces on the damper. They avoid sustained oscillations produced by the unbalanced aerodynamic forces, but require relatively large and powerful operating means.

SUMMARY OF THE INVENTION

According to this invention aerodynamic forces are employed to bias a butterfly damper without producing unstable and possibly sustained oscillatory positioning of the damper. The difficulties previously encountered in the use of such a biasing means have been overcome. It is no longer necessary to swamp-out the unbalanced and unstable aerodynamic forces, making possible the use of much smaller and much less powerful actuators.

DESCRIPTION OF A PREFERRED EMBODIMENT

Figure 1:
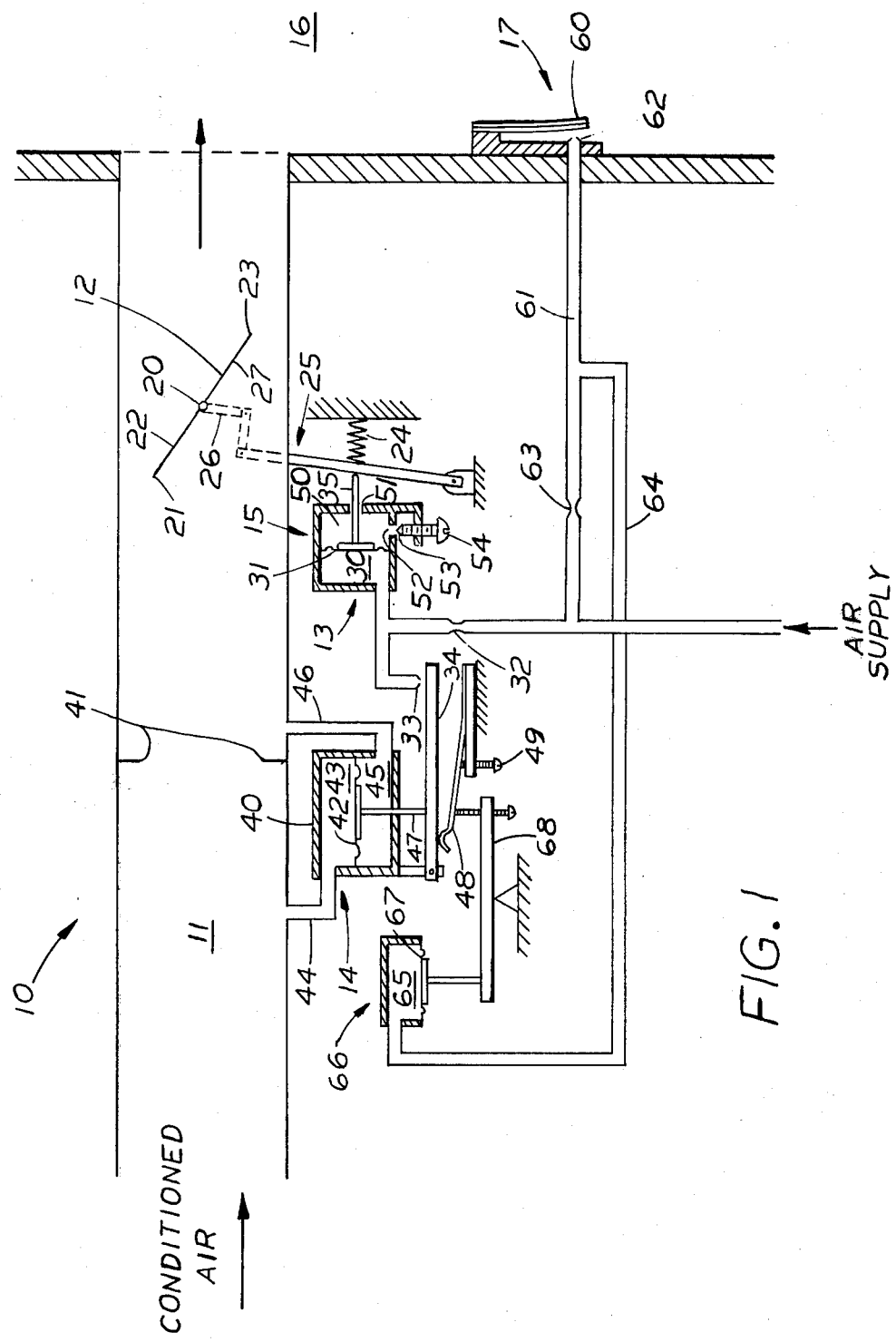
FIG. 1 is a schematic diagram of a preferred embodiment of this invention.

According to FIG. 1, a volume air flow controller 10 comprises a duct 11 provided with a butterfly damper 12, positioned by an actuator 13 in response to an air flow signal from a flow sensor 14 and damped by damping means 15. As shown, air from a source (not shown) at the left may be delivered through duct 11 to a space 16, in which another condition, such as temperature, is sensed by a condition sensor 17 providing a condition signal employed to reset the control point for the air flow through the duct. In such an application the supplied air would be conditioned to correct any deviation of sensed condition from a setpoint.

Figure 2:
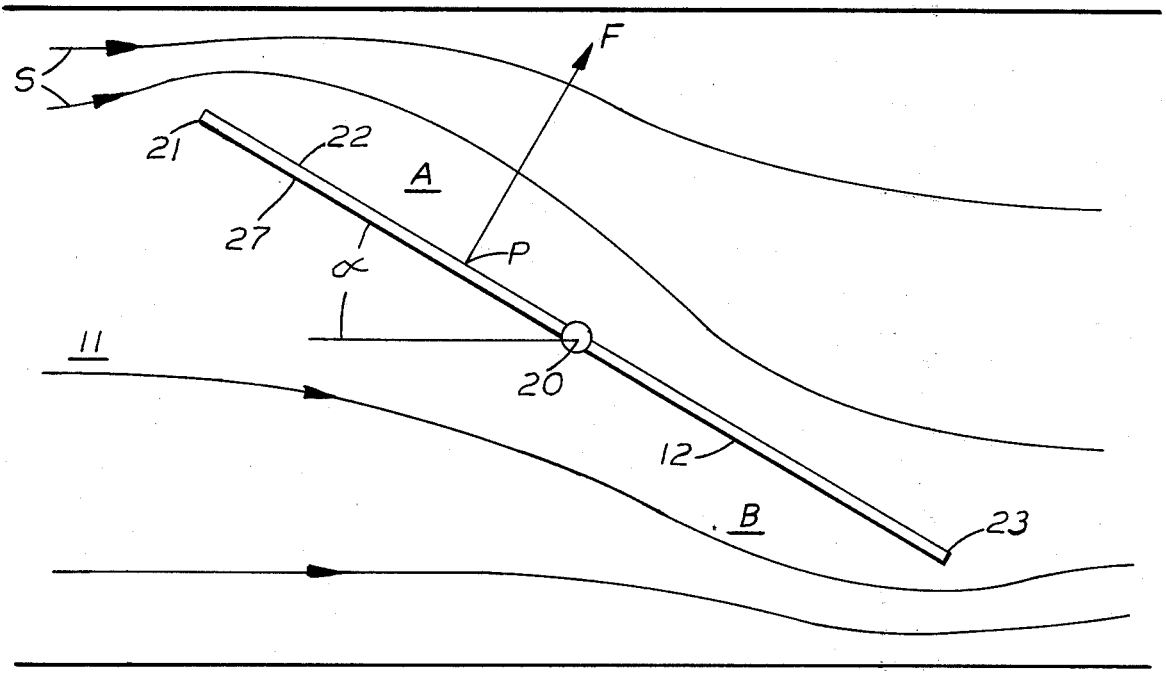
FIG. 2 is a sketch demonstrating the affect of air flow on a butterfly damper.
Figure 3:
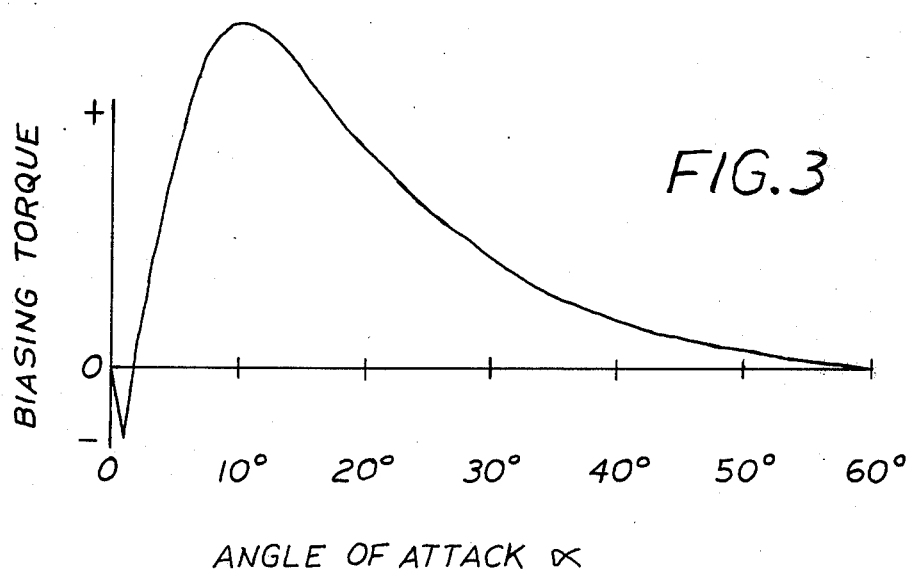
FIG. 3 is a typical graph of bias torque on the damper plotted against the angle of attack.

A pivot 20 supports damper 12 for rotation about an axis through its center, so that the damper is substantially balanced. Air flowing past the damper forms an air stream S, which, when the dammper is at an angle α, as seen in FIG. 2, in flowing over leading edge 21 creates a partial vacuum in area A along the downstream face 22 of the damper. The flow toward the trailing edge 23 reduces the pressure against the upstream face 27 in area B. The sizes and shapes of the areas A and B change with the angle of attack and with the velocity of the air flow, which in turn is dependent upon the difference in air pressure across the damper 12. The vacuum and pressure reduction create an effective force F at a position P. The amplitude of force F and its position P will change with the angle α and the velocity of the air flow. When position P is between the leading edge 21 and pivot 20, a damper-closing bias torque is produced. When position P coincides with pivot 20, there is no bias torque. When position P is between pivot 20 and trailing edge 23, a damper-opening bias torque is produced. When the damper is closed, regardless of the angle of attack, there is no aerodynamic bias torque produced, because there is no air flow. When the damper is fully open (angle of attack α = 0°) there is no aerodynamic torque produced, becase both faces 22, 27 are acted upon symmetrically. As the angle of attack increases from 0°, the forces acting upon damper 12 are very unstable, so that the position P moves across the pivot 20 one or more times, resulting in bias torque reversal and producing a fluttering of the damper. As the angle is further increased and up to the closed position of the damper, a damper-closing bias torque is produced. An illustration curve showing this change in torque appears in FIG. 3 as a function of the angle of attack for a damper that is closed when the angle of attack is 60°. Damper-closing torque is shown as + and damper-opening torque as −. The shape of the curve can vary widely dependent upon conditions. A spring 24, or other force, may be employed to offset any damper-opening bias torque produced by the aerodynamic forces. When very low air pressures exist in the duct, the damper-closing bias torque produced at some angles of attack may be insufficient to overcome the effective static friction of the damper. The effective static friction comprises the static friction of the pivot 20, mechanism 25, and actuator 13. The spring 24, or another force producer, may be employed to supplement the damper-closing aerodynamic bias torque to overcome the effective static friction. The spring is kept as weak as possible, however, in order to minimize the size and energy requirements of the actuator 13. If the damper-opening bias torque is not encountered, as by use of limits on damper movement, only the static friction need be overcome by spring 24.

The actuator 13 is shown as comprising a variable volume pneumatic pressure chamber 30 having a movable wall, shown as a flexible diaphragm 31. Air in excess of atmospheric pressure is delivered to chamber 30 from an air supply (not shown) through a restriction 32, to limit the volume of air delivered, and is exhausted through a bleed nozzle 33, controlled by a flapper 34. When the air being exhausted through nozzle 33 is less than that being delivered through restriction 32, pressure in chamber 30 increases, moving the diaphragm 31 outwardly. This outward motion, and the force causing it, is transmitted by rod 35 and mechanism 25 to arm 26, where it is converted to an operating torque to rotate the damper 12 toward full open position in opposition to the bias and offsetting torques. Motion of the damper continues until the opposed torques are equal. When the air being exhausted through nozzle 33 exceeds that being delivered through restriction 32, pressure in chamber 30 decreases, so that the torque produced thereby is reduced. This permits the bias and offsetting torques to exceed the operating torque so that the damper is moved toward closed position until a balance between the opposed torques is again achieved. The actuator need only be powerful enough to balance the maximum closing torques.

The flow sensor 14, as shown, comprises a differential pressure to mechanical motion transducer 40 measuring the pressure drop across an orifice 41 in the duct 11. The transducer is divided by a diaphragm 42 into a high pressure chamber 43 connected to receive air pressure from the duct upstream in relation to the orifice through high pressure inlet 44 and a low pressure chamber 45 connected to receive air pressure from the duct downstream in relation to the orifice through low pressure inlet 46. The difference in pressures in chambers 43, 45 acting on diaphragm 42 is a function of the air velocity and therefore of the volume of air flowing through the orifice. The resulting differential force on the diaphragm is transmitted as a flow signal through a rod 47 to the flapper 34 in a direction to open nozzle 33. A control signal as a function of the desired air flow is established by a leaf spring 48 bearing on the flapper in opposition to rod 47. The control point may be determined by a screw 49.

As described so far in detail, the controller will regulate the air flow to provide a constant flow. If the flow tends to increase, as due to increased upstream air pressure, the increased flow will be detected by the flow sensor 14 as an increased pressure differential, whereupon the flapper 34 will be moved away from nozzle 33. This permits a reduction in pressure in chamber 30, resulting in movement of damper 12 toward closed position to restrict air flow though the duct 11. This reduced flow will be detected in a feedback to the flow sensor, which will again reposition the flapper to increase pressure in chamber 30, resulting in a partial opening of the damper. This repetitive repositioning will continue until a stable equilibrium is established. Because the effective position of the partial vacuum on damper 12, and consequently the magnitude of the biasing torque, is very unstable, especially in the vicinity of pivot 20, a stable equilibrium is almost impossible to achieve under all conditions with the apparatus so far described in detail. This deficiency is overcome by the damping means 15, shown as integral with actuator 13. It comprises a chamber 50, one wall of which is movable wall 31 of the actuator. The reciprocable rod 35, transmitting motion from the movable wall to mechanism 25, passes through an opening 51 in a wall of the chamber. The clearance between the rod and the opening provides a restriction to the passage of air into and out from the chamber in responses to changes in position of the movable wall 31. A separate restriction, shown as a port 52, may be made adjustable, as by a needle 53 positioned as by a screw 54. The separate restriction may supplement or replace the clearance as the restriction. The essential feature is that the restriction be small enough to prevent rapid movement of the damper, such as may cause oscillations, yet large enough to permit stable repositioning of the damper within an acceptable period of time.

When it is desired to control volume air flow as a functon of a sensed condition, the control point for the air flow is reset as a function of the sensed condition. As shown in FIG. 1, the temperature in space 16 is controlled by regulating the amount of conditioned air admitted into the space through duct 11. The condition sensor 17 is shown as a pneumatic bleed type thermostat comprising a bimetal 60, sensing, and being deflected in response to, ambient temperature in the space, to control the bleed of air from a chamber 61 through a nozzle 62 — the air being delivered to chamber 61 in excess of atmospheric pressure from an air supply (not shown) through a restriction 63. Let us assume that cooled air is being supplied to the space 16 through duct 11. As the temperature in the space rises, the bimetal 60 will be deflected toward the nozzle 60, decreasing the bleed of air therethrough and increasing the pressure in chamber 61, connected by conduit 64 to a closed chamber 65 in a pressure to mechanical force transducer 66. One wall 67 of the closed chamber is movable, the force exerted on the wall and the motion resulting therefrom being transmitted through a mechanism, shown as comprising a lever 68 to the spring 48 controlling the air flow setpoint. As the pressure in chamber 65 increases, the control point is increased, resulting in a greater cool air flow through duct 11 into the space 16, thereby reducing the temperature. As the sensed temperature falls, the operation is reversed.

The described embodiment is exemplary only and does not define the limits of the invention. It will be obvious to those skilled in the art that substitutions and modifications may be made without departing from the spirit of the invention. It is not necessary that the movable wall 31 be common to actuator 13 and damping means 15. The damping means could be remote from the actuator as long as it served the same function. The sensors 14, 17 could produce flow and condition variable electrical signals by use of well-known electrical or electronic equivalents of the pneumatic and mechanical components described. The actuator could then be a solenoid or an electric motor driven operator. While the damping means 15 is described as employing ambient air as the damping fluid, any low-viscosity fluid, such as oil or water, could be used along with a suitable sump. It will further be obvious that, when the actuator 13 and damping means 15 are separate, the rod 35 need not pass through chamber 50. The reciprocable rod 35 could be replaced by an oscillable lever as a transmitter of motion. The damper 12 need not move through 90° between closed and full open positions, as described. The limits of the invention are defined by the claims.

We claim:

1. A volume air flow controller employing as a damper biasing means a bias torque acting on said damper as a function of the unstable, unbalanced aerodynamic forces produced by the air flow past the damper, said controller comprising in combination a duct, a butterfly damper movable about a pivot between closed and opened positions to control air flow through said duct, means for applying to the damper a supplementary torque in a damper-closing direction substantially only sufficient to overcome the effective static friction of the damper in a damper-opening direction, an actuator applying an operating torque for moving said damper toward the fully opened position, said actuator being substantially only sufficiently powerful to balance the maximum resultant of said bias and supplementary torques, a flow sensor producing a flow signal as a function of the sensed value of said volume air flow, means for establishing a control signal as a function of a desired value of said volume air flow, and means responsive to the difference between said signals for controlling the actuator such that the damper is variably positioned to provide the desired value of said volume air flow.

2. A volume air flow controller according to claim 1 wherein said supplementary torque applying means comprises a spring.

3. A volume air flow controller according to claim 1 wherein said actuator comprises a pneumatic operator.

4. A volume air flow controller according to claim 1 wherein said flow sensor comprises a differential pressure sensor.

5. A volume air flow controller according to claim 1 wherein said pivot passes substantially through the center of said damper.

6. A volume air flow controller according to claim 1 wherein said control signal establishing means is adjustable.

7. A volume air flow controller according to claim 1 additionally comprising a condition sensor producing a condition signal as a function of another sensed condition, said control signal further comprising the condition signal.

8. A volume air flow controller according to claim 7 wherein said condition sensor comprises a thermostat.

9. A volume air flow controller according to claim 1 further comprising means for resetting said control signal establishing means.

10. A volume air flow controller according to claim 1 additionally comprising means for continuously damping movement of the damper to reduce oscillation thereof.

11. A volume air flow controller according to claim 10 wherein said damping means comprises a chamber, a wall of said chamber movable in response to movement of the damper, and means for restricting flow of a fluid into and out from said chamber in response to movement of the wall.

12. A volume air flow controller according to claim 11 wherein said fluid comprises air.

13. A volume air flow controller according to claim 11 wherein said actuator comprises a variable volume pressure chamber, said movable wall being common to the damping means and said actuator.

14. A volume air flow controller according to claim 13 wherein said movable wall comprises a flexible diaphragm.

15. A volume air flow controller according to claim 13 additionally comprising a member movable by said movable wall and passing through an opening in the damping chamber, the restricting means comprising the clearance between said member and said opening.

16. A volume air flow controller according to claim 15 wherein said movable member comprises a reciprocable rod.

17. A volume air flow controller according to claim 11 wherein said restricting means comprises means for adjusting the flow of fluid through said restricting means.

18. A method for controlling volume air flow through a duct comprising the steps of applying to a butterfly damper in said duct a damper-closing bias torque variable in magnitude as a function of unstable, unbalanced, aerodynamic forces produced by the air flow past the damper, applying to the damper a supplementary torque in a damper-closing direction substantially only sufficient to overcome the effective static friction of said damper in a damper-opening direction, sensing the volume air flow through the duct, and applying to the damper a damper-opening operating torque varying in magnitude as a function of said sensed volume air flow such that the damper is positioned to maintain a predetermined volume air flow through the duct by a balance between the operating bias and supplementary torques.

19. A method according to claim 18 additionally comprising further varying said operating torque as a function of another condition.

20. A method for controlling volume air flow through a duct comprising the steps of applying to a butterfly damper in said duct a bias torque variable in magnitude and direction as a function of unstable, unbalanced aerodynamic forces produced by the air flow past the damper, applying to the damper a supplementary torque in a damper-closing direction sufficient to overcome the effective static friction of said damper in a damper-opening direction, applying to the damper a damper-closing offset torque substantially only sufficient to offset any damper-opening bias torque, sensing the value of said volume air flow through the duct, and applying to the damper a damper-opening operating torque varying in magnitude as a function of the sensed value of said volume air flow such that the damper is positioned to maintain a predetermined volume air flow through the duct by a balance between the operating, bias, supplementary and offset torques.

21. A method according to claim 20 further comprising damping motion of the damper sufficiently to prevent sustained oscillation of the damper.

22. A method according to claim 20 additionally comprising further varying said operating torque as a function of another condition.

23. A volume air flow controller employing as a damper biasing means a bias torque acting on said damper as a function of the unstable, unbalanced aerodynamic forces produced by the air flow past the damper, said controller comprising in combination a duct, a butterfly damper movable about a pivot between closed and opened positions to control air flow through said duct, means for applying to the damper a damper-closing offset torque substantially only sufficient to balance the maximum bias torque in a damper-opening direction, means for applying to the damper a supplementary torque in a damper-closing direction sufficient to overcome the effective static friction of the damper in a damper-closing direction, an actuator applying an operating torque for moving said damper toward the fully opened position, said actuator being substantially only sufficiently powerful to balance the maximum resultant of said bias, offset and supplementary torques, a flow sensor producing a flow signal as a function of the sensed value of said volume air flow, means for establishing a control signal as a function of a desired value of said volume air flow, and means responsive to the difference between said signals for controlling the actuator such that the damper is variably positioned to provide the desired value of said volume air flow.

* * * * *

UNITED STATES PATENT OFFICE
CERTIFICATE OF CORRECTION

Patent No. 4,042,173                    Dated August 16, 1977

Inventor(s) George C. Boyer and Raymond J. Fermanich

It is certified that error appears in the above-identified patent and that said Letters Patent are hereby corrected as shown below:

Column 1, line 52, change "prodcing" to --producing--, and line 59, change "undeirable" to --undesirable--.

Column 2, line 37, change "dammper" to --damper--.

Column 4, line 48, change "60" to --62--.

Column 5, line 27, delete "in a damper-opening direction".

Column 6, line 32 delete the comma (,) at the end of the line.

line 37, delete "in a damper-opening direction", line 43, after "operating" insert a comma (,), line 55, delete "in a" and line 56, delete "damper-opening direction".

Column 8, line 2, delete "in a damper-closing direction".

Signed and Sealed this

Eleventh Day of April 1978

[SEAL]

Attest:

RUTH C. MASON
Attesting Officer

LUTRELLE F. PARKER
Acting Commissioner of Patents and Trademarks